(12) United States Patent
Farah et al.

(10) Patent No.: US 10,006,308 B2
(45) Date of Patent: Jun. 26, 2018

(54) MID-TURBINE FRAME WITH FAIRING ATTACHMENT

(71) Applicant: UNITED TECHNOLOGIES CORPORATION, Farmington, CT (US)

(72) Inventors: Jorge I. Farah, Hartford, CT (US); Jonathan P. Burt, Sturbridge, MA (US); Paul K. Sanchez, New Britain, CT (US); Kalpendu J. Parekh, Colchester, CT (US); Jonathan J. Jakiel, Vernon, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 276 days.

(21) Appl. No.: 14/438,562

(22) PCT Filed: Sep. 11, 2013

(86) PCT No.: PCT/US2013/059195
§ 371 (c)(1),
(2) Date: Apr. 24, 2015

(87) PCT Pub. No.: WO2014/052007
PCT Pub. Date: Apr. 3, 2014

(65) Prior Publication Data
US 2015/0260057 A1 Sep. 17, 2015

Related U.S. Application Data (60) Provisional application No. 61/707,425, filed on Sep. 28, 2012.

(51) Int. Cl.
*F01D 1/00* (2006.01)
*F01D 25/28* (2006.01)
(Continued)

(52) U.S. Cl.
CPC ........... *F01D 25/28* (2013.01); *F01D 25/162* (2013.01); *F01D 25/24* (2013.01); *F01D 25/26* (2013.01); *F02C 7/20* (2013.01); *F05D 2240/91* (2013.01)

(58) Field of Classification Search
CPC .......... F01D 25/28; F01D 25/24; F01D 25/26; F01D 11/003; F01D 11/005; F02C 7/20;
(Continued)

(56) References Cited

U.S. PATENT DOCUMENTS 5,451,116 A * 9/1995 Czachor ................. F01D 9/065
403/28
2003/0161727 A1* 8/2003 MacLean ................. F23R 3/50
415/196

(Continued)

FOREIGN PATENT DOCUMENTS

EP 2192276 A2 6/2010

OTHER PUBLICATIONS

International Search Report for related International Application No. PCT/US13/59195; report dated Feb. 10, 2014.

(Continued)

*Primary Examiner* — Pascal M Bui Pho
*Assistant Examiner* — Edwin Kang
(74) *Attorney, Agent, or Firm* — Cantor Colburn LLP (57) ABSTRACT

A mid-turbine frame (MTF) system for a gas turbine engine is disclosed. The MTF includes an inner case, an outer case and a fairing sandwiched between the inner and outer cases. The fairing includes an inner ring spaced apart from and coupled to an outer ring by a plurality of hollow struts. The hollow struts accommodate support rods that connect the inner case to the outer case. Further, the hollow struts act as turning vanes for turning the flow of gases passing from a high pressure turbine (HPT) to a low pressure turbine (LPT) for purposes of providing the correct incidence angle to the first vane of the LPT. The outer ring of the fairing includes a plurality of bosses which receive attachment pins that pass (Continued)

through the outer case for correctly locating the fairing with respect to the outer case and for permitting radial expansion in contraction of the fairing.

19 Claims, 6 Drawing Sheets

(51) Int. Cl.
*F01D 25/24* (2006.01)
*F02C 7/20* (2006.01)
*F01D 25/16* (2006.01)
*F01D 25/26* (2006.01)

(58) Field of Classification Search
CPC ............ F05D 2240/91; F05D 2240/58; F05D 2240/581; F02D 7/28
See application file for complete search history.

(56) References Cited

U.S. PATENT DOCUMENTS

| | | |
|---|---|---|
| 2009/0142182 A1 | 6/2009 | Kapustka |
| 2010/0132373 A1 | 6/2010 | Durocher et al. |
| 2010/0132376 A1* | 6/2010 | Durocher ................ F01D 9/065 60/797 |
| 2010/0275572 A1 | 11/2010 | Durocher et al. |
| 2011/0081237 A1* | 4/2011 | Durocher ................ F01D 9/06 415/173.1 |

OTHER PUBLICATIONS

Extended European Search Report for Application No./Patent No. 13842236.5-1610/2900973, dated Oct. 21, 2016 (6 pp).

\* cited by examiner

MID-TURBINE FRAME WITH FAIRING ATTACHMENT

CROSS-REFERENCE TO RELATED APPLICATIONS

This application is a U.S. National Stage under 35 U.S.C. § 371 of International Patent Application No. PCT/US13/59195 filed on Sep. 11, 2013, claiming priority under 35 U.S.C. § 119(e) to U.S. provisional Patent Application No. 61/707,425 filed on Sep. 28, 2012.

TECHNICAL FIELD

This disclosure relates generally to gas turbine engines and more particularly, to engine case structures for gas turbine engines, such as mid-turbine frames and similar structures.

DESCRIPTION OF RELATED ART

Figure 1:
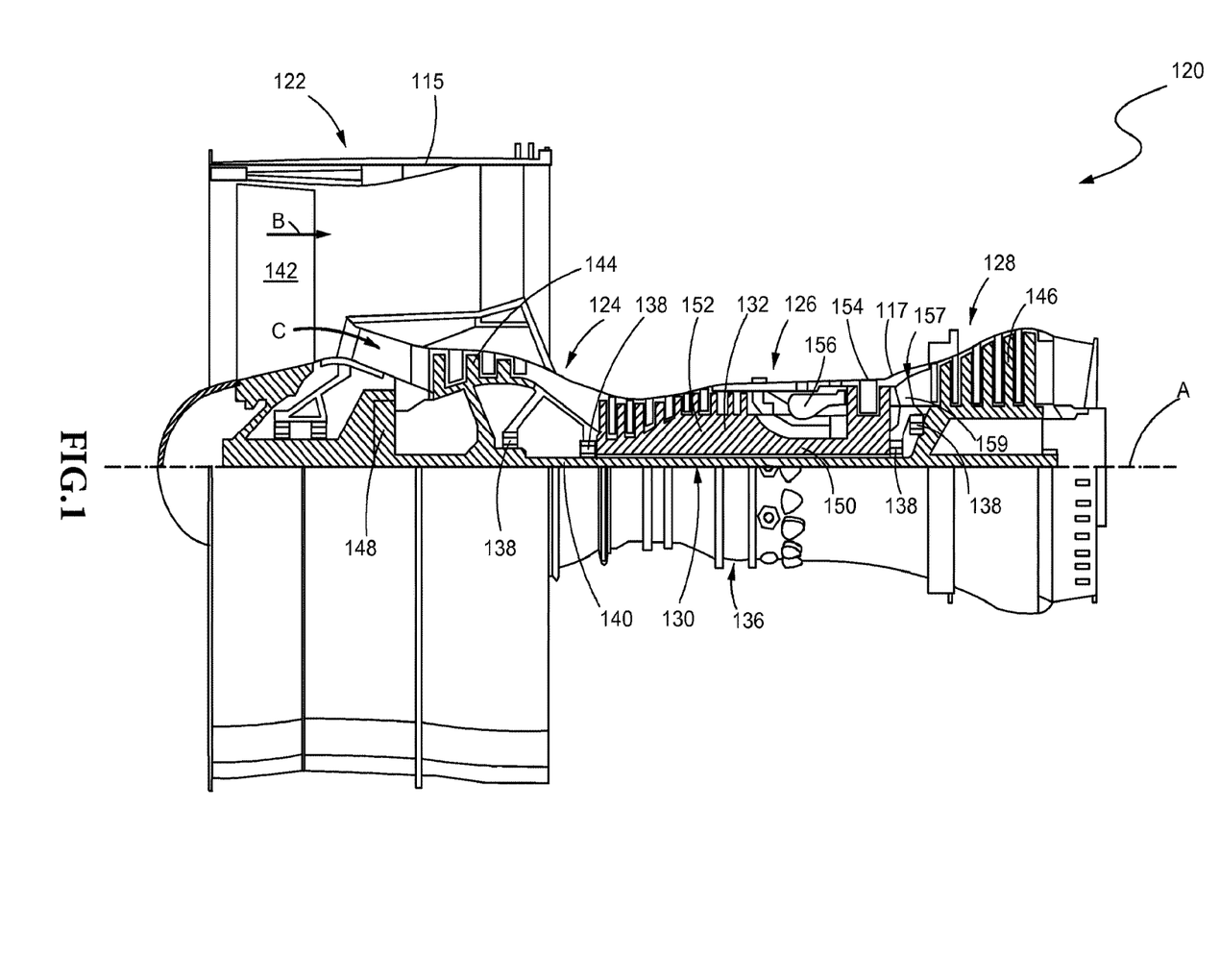
FIG. 1 is a schematic/sectional view of a gas turbine engine.

FIG. 1 schematically illustrates a gas turbine engine 120. The disclosed gas turbine engine 120 is a two-spool turbofan that includes a fan section 122, a compressor section 124, a combustor section 126 and a turbine section 128. Alternative engines might include an augmentor section (not shown), or an intermediate spool, among other systems or features. The fan section 122 drives air along a bypass flowpath B in a bypass duct defined within a nacelle 115. In contrast, the compressor section 124 drives air along a core flowpath C for compression before it is delivered to the combustor section 126, where the compressed air is mixed with fuel and combusted before it is expanded in the turbine section 128. Although FIG. 1 depicts a turbofan gas turbine engine, it should be understood that the concepts described herein are not limited to use with turbofans as the teachings of this disclosure may be applied to other types of turbine engines including three-spool architectures.

The engine 120 generally includes a low speed spool 130 and a high speed spool 132 mounted for rotation about an engine central longitudinal axis A relative to an engine static structure 136 via several bearing systems 138. It should be understood that additional or alternative bearing systems 138 at various locations may be provided.

The low speed spool 130 generally includes an inner shaft 140 that interconnects a fan 142, a low pressure compressor (LPC) 144 and a low pressure turbine (LPT) 146. The inner shaft 140 is connected to the fan 142 through a geared architecture 148 to drive the fan 142 at a lower speed than the low speed spool 130. The high speed spool 132 includes an outer shaft 150 that interconnects a high pressure compressor (HPC) 152 and a high pressure turbine (HPT) 154. A combustor 156 is arranged between the HPC 152 and the HPT 154. A mid-turbine frame (MTF) 157 of the engine static structure 136 is arranged generally between the HPT 154 and the LPT 146. The inner shaft 140 and the outer shaft 150 are concentric and rotate about the engine central longitudinal axis A.

The core airflow is compressed by the low pressure compressor 144 and then by the high pressure compressor 152 before it is mixed and burned with fuel in the combustor 156. The combustion products are then expanded by the HPT 154 and the LPT 146. The turbines 146, 154 rotationally drive the respective low speed spool 130 and high speed spool 132 in response to the expansion.

The mid-turbine frame (MTF) system 157, sometimes referred to as an inter-turbine frame, is located generally between the HPT 154 and the LPT 146. The MTF system 157 supports one or more bearings 138 and transfers bearing loads to the outer engine case 117. The MTF system 157 may also include a static fairing 159 for transitioning air from the HPT to the LPT.

Current designs for static fairings 159 may employ single or multiple vanes/platforms which may be attached directly to the outer case. The vanes or platforms may be mechanically joined to each other to form a full ring structure or the fairing may be a homogenous single piece structure which is also attached to the outer case. The means for attaching the fairing 159 to the outer case 117 requires some form of a mount to integrate the hot fairing 159 to the cold outer case 117. Current mounting assemblies typically include segmented hooks, flexures and/or mechanical fasteners and the like that attach the hot fairing 159 to the cold outer case 117 as disclosed in U.S. Pat. No. 8,245,518. Further, there must be some sort of sealing between the fairing 159 and the outer case 117, both forward and aft of the fairing 159, which is difficult to achieve because of the temperature differential between the fairing 159 and the outer case 117 and because of the forces imposed on the fairing 159 by the gases passing through the fairing 159.

As a result, problems associated with the current mounting designs for static hot fairings of MTF systems include: high and/or unbalanced reaction loads; thermally constrained mounts; vibratory induced loading to both the fairing and the outer case; the need for secondary cooling air leakage; and the need for a cavity inside the MTF for an internal purge.

SUMMARY OF THE DISCLOSURE

A mid-turbine frame system is disclosed which includes an inner case that may include a leading end and a trailing end. The leading end of the inner case may be coupled to an inner seal carrier. The inner seal carrier may support an inner leading end seal. The trailing end of the inner case may support an inner trailing end seal. The mid-turbine frame system may also include a fairing. The fairing may include an inner ring spaced apart from and coupled to an outer ring by a plurality of hollow struts. The inner and outer rings may each include leading and trailing ends. The inner leading end seal may be sandwiched between the inner seal carrier and the leading end of the inner ring of the fairing. The inner trailing end seal may be sandwiched between the trailing end of the inner case and the trailing end of the inner ring of the fairing. The hollow struts of the fairing may each accommodate a support rod. Each support rod may have an inner end connected to the inner case and an outer end connected to the outer case. The outer ring of the fairing may include a plurality of attachment pin bosses. Each attachment pin boss may accommodate an attachment pin. Each attachment pin may be connected to the outer case. The leading end of the outer case may support an outer leading end seal. The trailing end of the outer case may support an outer trailing end seal. The outer leading end seal may be sandwiched between the leading end of the outer ring of the fairing and an outer seal carrier. The outer seal carrier may be connected to the leading end of the outer case. The outer trailing end seal may be sandwiched between the trailing end of the outer ring of the fairing and the trailing end of the outer case.

In another aspect, a gas turbine engine is disclosed which may include a high pressure turbine, a low pressure turbine and a mid-turbine frame system disposed between the high and low pressure turbines for transitioning gases from the high pressure turbine to the low pressure turbine and for rotating said gases as said gases proceed from the high pressure turbine to the low pressure turbine. The mid-turbine frame system may include an inner case that may include a leading end and a trailing end. The leading end of the inner case may be coupled to an inner seal carrier. The inner seal carrier may support an inner leading end seal. The trailing end of the inner case may support an inner trailing end seal. The mid-turbine frame system may also include a fairing that includes an inner ring spaced apart from and coupled to an outer ring by a plurality of hollow struts. The inner and outer rings may each include leading and trailing ends. The inner leading end seal may be sandwiched between the inner seal carrier and the leading end of the inner ring of the fairing. The inner trailing end seal may be sandwiched between the trailing end of the inner case and the trailing end of the inner ring of the fairing. The hollow struts of the fairing may each accommodate a support rod. Each support rod may have an inner end connected to the inner case and an outer end connected to the outer case. The outer ring of the fairing may include a plurality of attachment pin bosses. Each attachment pin boss may accommodate an attachment pin. Each attachment pin may be connected to the outer case. The leading end of the outer case may support an outer leading end seal. The trailing end of the outer case may support an outer trailing end seal. The outer leading end seal may be sandwiched between the leading end of the outer ring of the fairing and an outer seal carrier. The outer seal carrier may be connected to the leading end of the outer case. The outer trailing end seal may be sandwiched between the trailing end of the outer ring of the fairing and the trailing end of the outer case.

In any one or more of the embodiments described above, the leading end of the inner ring of the fairing may include an inner leading end brazed support band, wherein the inner leading end seal may be sandwiched between the inner leading end brazed support band and the inner seal carrier.

In any one or more of the embodiments described above, the leading end of the outer ring of the fairing may include an outer leading end brazed support band, wherein the outer leading end seal may be sandwiched between the outer leading end brazed support band and the outer seal carrier.

In any one or more of the embodiments described above, the trailing end of the inner ring of the fairing may include an inner trailing end brazed support band, wherein the inner trailing end seal may be sandwiched between the inner trailing end brazed support band and the trailing end of the inner case.

In any one or more of the embodiments described above, the trailing end of the outer ring of the fairing may include an outer trailing end brazed support band, wherein the outer trailing end seal may be sandwiched between the outer trailing end brazed support band and the trailing end of the outer case.

In any one or more of the embodiments described above, the inner ring of the fairing, the inner leading end seal, the inner seal carrier, the inner trailing end seal and the inner case may define an inner diameter cavity.

In any one or more of the embodiments described above, the outer ring of the fairing, the outer leading end seal, the outer seal carrier, the outer trailing end seal and the outer case may define an outer diameter cavity.

In any one or more of the embodiments described above, the inner ring and the outer ring of the fairing are frusto-conically shaped and coaxial with respect to each other along a common axis. The hollow struts may be disposed in a non-parallel relationship with the common axis so the hollow struts may cause gases passing between the inner and outer rings to rotate.

In any one or more of the embodiments described above, the hollow struts may act as vanes for turning gases that pass between the inner and outer rings of the fairing.

In any one or more of the embodiments described above, the attachment pins may be slidably received in the attachment pin bosses of the outer ring of the fairing for permitting the fairing to expand radially outwards towards the outer case and for permitting the fairing to retract radially inwards towards the inner case.

In any one or more of the embodiments described above, the fairing may include more than twelve hollow struts.

Other advantages and features will be apparent from the following detailed description when read in conjunction with the attached drawings.

BRIEF DESCRIPTION OF THE DRAWINGS

For a more complete understanding of the disclosed methods and apparatuses, reference should be made to the embodiments illustrated in greater detail on the accompanying drawings, wherein.

It should be understood that the drawings are not necessarily to scale and that the disclosed embodiments are sometimes illustrated diagrammatically and in partial views. In certain instances, details which are not necessary for an understanding of the disclosed methods and apparatuses or which render other details difficult to perceive may have been omitted. It should be understood, of course, that this disclosure is not limited to the particular embodiments illustrated herein.

DETAILED DESCRIPTION OF THE PRESENTLY PREFERRED EMBODIMENTS

The disclosed mid-turbine frame (MTF) system 10 has the following functionality. First, referring briefly to FIGS. 3-4, the MTF system 10 transitions air and combustion gases (hereinafter referred to as "gases") from the high pressure turbine (HPT) 11 to the low pressure turbine (LPT) 12 and, during this transition of the gases from the HPT 11 to the LPT 12, the MTF 10 acts to turn or rotate the gases to correct the incident angle of the gases against the first blade of the LPT 12, or the third stage of the LPT 12. To accomplish this, the fairing 13 as shown in FIG. 1 may include a plurality of turning vanes, which are provided in the form of hollow struts 14 as discussed in greater detail below. The hollow struts 14 also provide a path for the passage of support rods 15 (see FIGS. 4-5) that connect the inner case 16 to the outer case 17. Further, the MTF system 10 may also be configured to create an inner diameter cavity 18 and an outer diameter cavity 19. The inner diameter cavity 18 and the outer diameter cavity 19 act to protect the bearing compartment 21 (FIGS. 3-4) and the cold outer case 17 (FIGS. 3-6) respectively from the hot combustion gases passing from the HPT 11 to the LPT 12. The inner and outer diameter cavities 18, 19 respectively are created in part by four seals including an inner leading end seal 22, an outer leading end seal 23, an inner trailing end seal 24 and an outer trailing end seal 25. The seals 22-25 and the structures that define the cavities 18-19 will be discussed in greater detail below. In addition to playing a role in creation of the cavities 18-19, the seals 22-25 also provide a damping pre-load to the MTF 10. An additional feature of the disclosed MTF 10 is the use of a plurality of attachment pin bosses 26 on the outer ring 27 of the fairing 13 and a plurality of attachment pins 28 and alignment bosses 29 for purposes of precisely locating the fairing 13 with respect to the outer case 17. The attachment pin bosses 26 and attachment pins 28 are also disposed at a balanced location at the center of the aerodynamic and thermal loads imposed upon the fairing 13 by the gases passing between the outer ring 27 and the inner ring 31 of the fairing 13. Further, the use of the plurality of attachment pins 28 that are slidably received in the plurality of attachment pin bosses 26 enables limited expansion and retraction of the fairing 13.

Thus, as shown below, the fairing 13 of the MTF 10 rotates the flow of gases through the fairing 13, transitions the flow of gases between the HPT 11 and the LPT 12, acts as a first major stage for the LPT 12, seals the flow of gases between the internal diameter cavity 18 and the outer diameter cavity 19 and acts as an overlap to the rotating components of the rotors of both the LPT 12 and HPT 11. As discussed in greater detail below, the leading end 32 of the inner ring 31, the leading end 33 of the outer ring 27, the trailing end 34 of the inner ring 31 and the trailing end 35 of the outer ring 27 of the fairing 13 are equipped with brazed support rings 36, 37, 38 and 39 respectively (FIGS. 3-6). Finally, the support rods 15, that pass through the hollow struts 14 of the fairing 13 are each supported on the outer case 17 by a retainer 41, centering pin 42 (see FIGS. 4 and 10) and support boss 43.

Figures 2, 3:
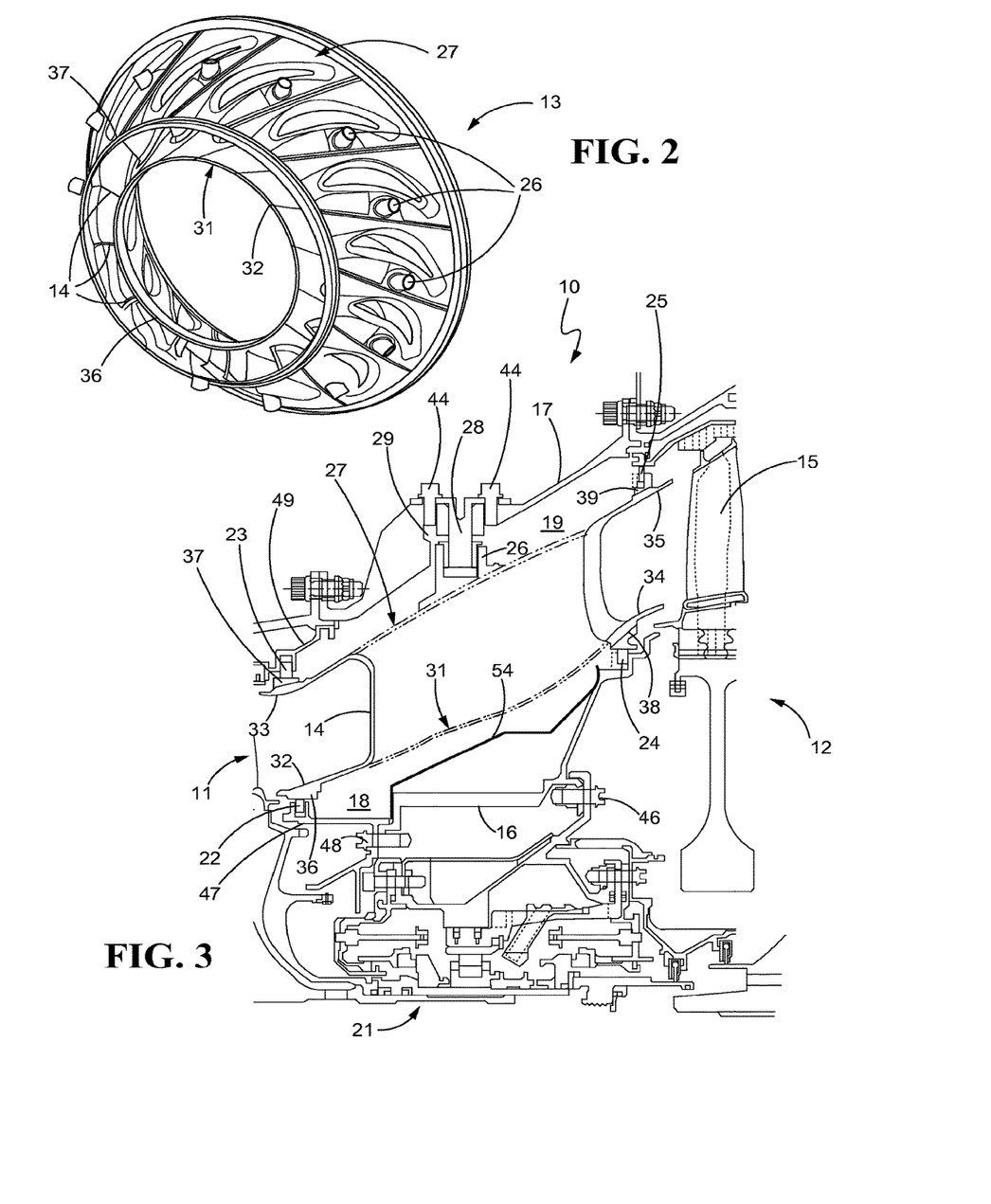
FIG. 2 is a perspective view of a disclosed fairing for use in the disclosed mid-turbine frame system.
FIG. 3 is a sectional view of the disclosed mid-turbine frame system.
Figure 4:
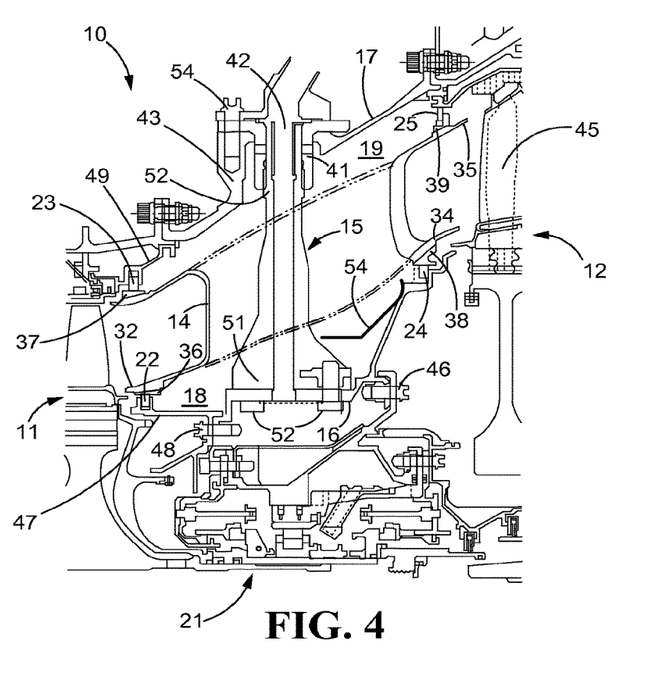
FIG. 4 is another sectional view of the disclosed mid-turbine frame system.

Turning to FIG. 2, a disclosed fairing 13 is illustrated. The fairing 13 includes an inner ring 31 having a leading end 32 that includes a brazed support band 36 on its interior surface as shown FIG. 3. The support band 36 engages the inner leading end seal 22. Similarly, the outer ring 27 also includes a leading end 33 that includes a brazed support band 37 on its exterior surface (FIG. 3) that engages the outer leading end seal 23. As shown in FIG. 3, the inner ring 31 also includes a trailing end 34 that includes a brazed support band 38 that engages the inner trailing end seal 24 and the outer ring 27 also includes a trailing end 35 that is equipped with a brazed support band 39 that engages the outer trailing end seal 25. As shown in FIG. 2, the outer ring 27 is equipped with a plurality of attachment pin bosses 26 which, as shown in FIG. 3, are used to locate the fairing 13 with respect to the outer case 17. Specifically, each attachment pin boss 26 is aligned with an alignment boss 29 disposed on the outer case 17. Attachment pins 28 are secured to the respective alignment bosses 29 by one or more fasteners 44. While the pins 28 are secured to the alignment bosses 29 by the fasteners 44, the pins 28 are slidably received in the support bosses 26 disposed on the outer ring 27 of the fairing 13. Thus, the fairing 13 is free to expand and contract radially as hot gases pass through the MTF 10. Also shown in FIGS. 2-4 are the plurality of hollow struts 14 through which the support rods 15 pass, but which also serve as vanes for turning or rotating the gases that flow between the inner ring 31 and the outer ring 27 of the fairing 13. This rotation of the gases passing between the inner ring 31 and the outer ring 27 provides a correct incidence angle to the first blade 45 of the LPT 12.

Other features of note of the MTF 10 shown in FIG. 3 are as follows. First, the inner case 16 surrounds the bearing case 21. The inner case 16 is connected to the bearing case 21 by the fastener 46. The inner case 16 is also connected to the inner HPT seal carrier 47 by the fastener 48. The inner HPT seal carrier 47, the inner leading end seal 22, the inner ring 31 of the fearing 13, the inner trailing end seal 24 and the inner case 16 define the inner diameter cavity 18. The inner diameter cavity 18 provides a buffer or insulation between the hot gases passing between the inner ring 31 and outer ring 27 of the fairing 13 and the bearing compartment 21. Thus, the components of the bearing compartment 21, which are not discussed in great detail here, are protected from the hot gases passing between the inner ring 31 and outer ring 27. Similarly, the outer diameter cavity 19 serves as insulation or as a buffer between the gases passing between the inner and outer rings 31, 27 and the cold outer case 17. The outer diameter cavity 19 is defined by the outer ring 27, the outer leading end seal 23, the outer HPT seal carrier 49, the outer case 17 and the outer trailing end seal 25.

Figure 5:
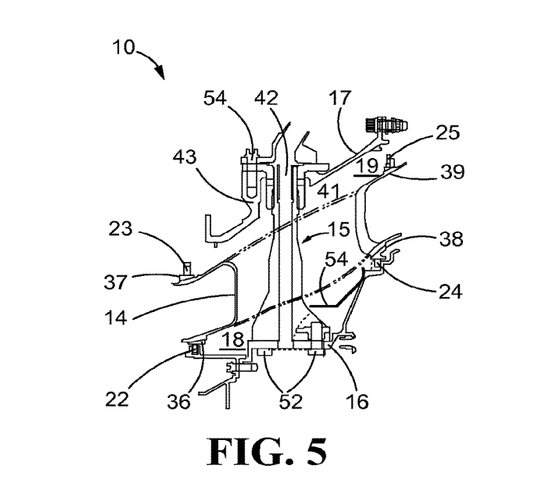
FIG. 5 is another sectional view of the disclosed mid-turbine frame system.
Figure 6:
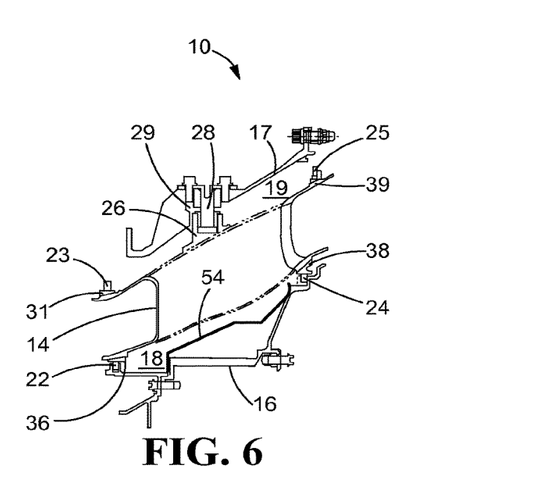
FIG. 6 is yet another sectional view of the disclosed mid-turbine frame system.

Turning to FIG. 4, the connection between the support rod 15, the inner case 16 and the outer case 17 is illustrated. Specifically, the support rod 15 includes an inner end 51 that is secured to the inner case 16 by one or more fasteners 52. The support rod 15 also includes an outer end 52 which may be hollow for purposes of receiving the metering device 42 that extends through the retainer 41. The outer end 52 may be received within the retainer 41 as shown in FIG. 4. The retainer 41 may be secured to the support boss 43 by one or more fasteners shown at 54 in FIG. 4. Also shown in FIGS. 3-4 is an inner heat shield 54 that provides additional protection for the bearing case 21. Simplified sectional views illustrating the connections between the support rod 15 and the inner and outer cases 16, 17 and the alignment of the attachment pin bosses 26 with the support boss 43 and attachment pin 28 are shown in FIGS. 5-6 respectively.

Figure 7:
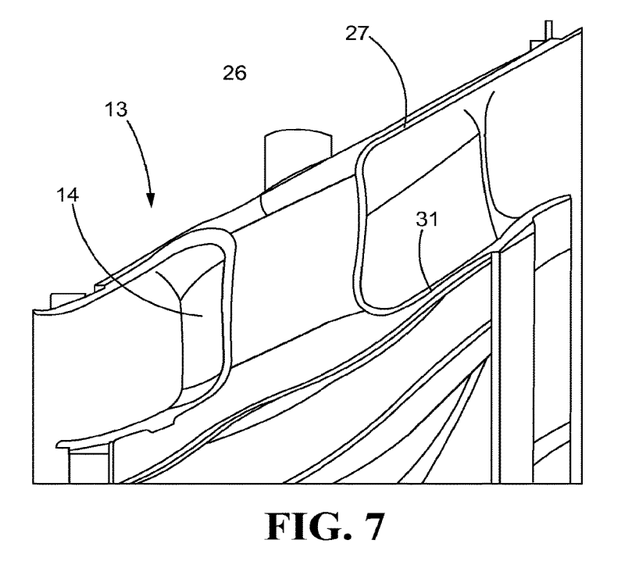
FIG. 7 is a partial sectional view of the fairing shown in FIG. 1.
Figure 8:
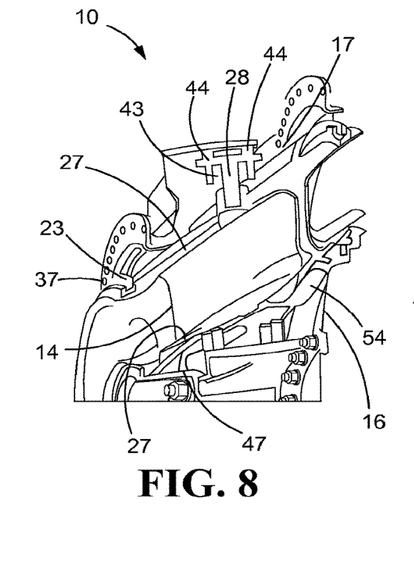
FIG. 8 is a partial side perspective and sectional view of the disclosed mid-turbine frame system.
Figure 9:
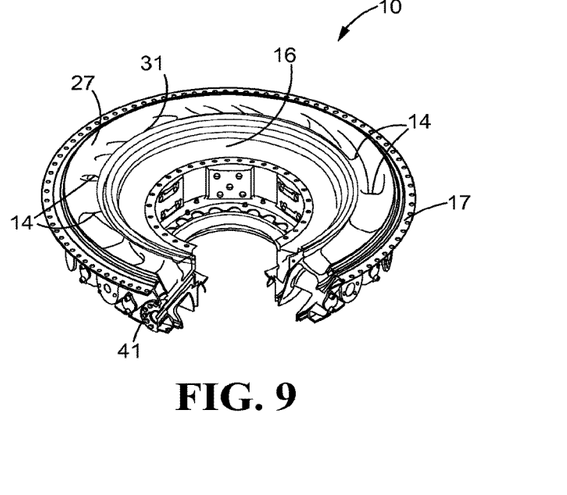
FIG. 9 is a partial bottom perspective and sectional view of the disclosed mid-turbine frame system.

Turning to FIG. 7, a partial sectional/perspective view of the fairing 13 is shown illustrating one of the hollow struts 14 that connect the outer ring 27 to the inner ring 31. The reader will note that the strut 14 is curved thereby providing a non-linear flow path around the strut 14. Thus, the strut 14 acts as a vane for turning or rotating gases that pass between the inner ring 31 and the outer ring 27. This concept of using the hollow struts 14 for rotating or turning the gases passing between the inner ring 31 and the outer ring 27 is also illustrated in the partial sectional/perspective views of FIGS. 8-9.

Figure 10:
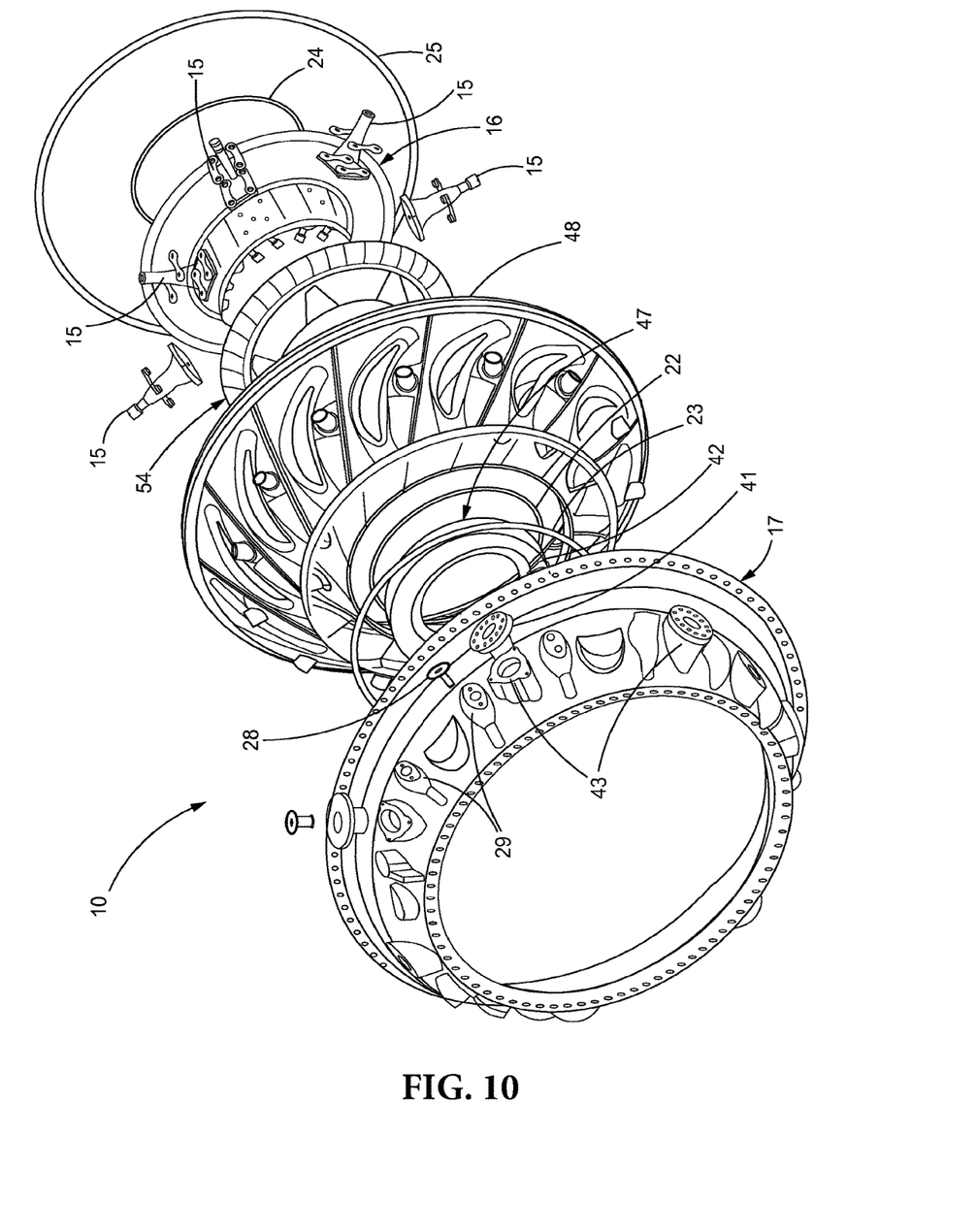
FIG. 10 is an exploded view of the disclosed mid-turbine frame system.
Figure 11:
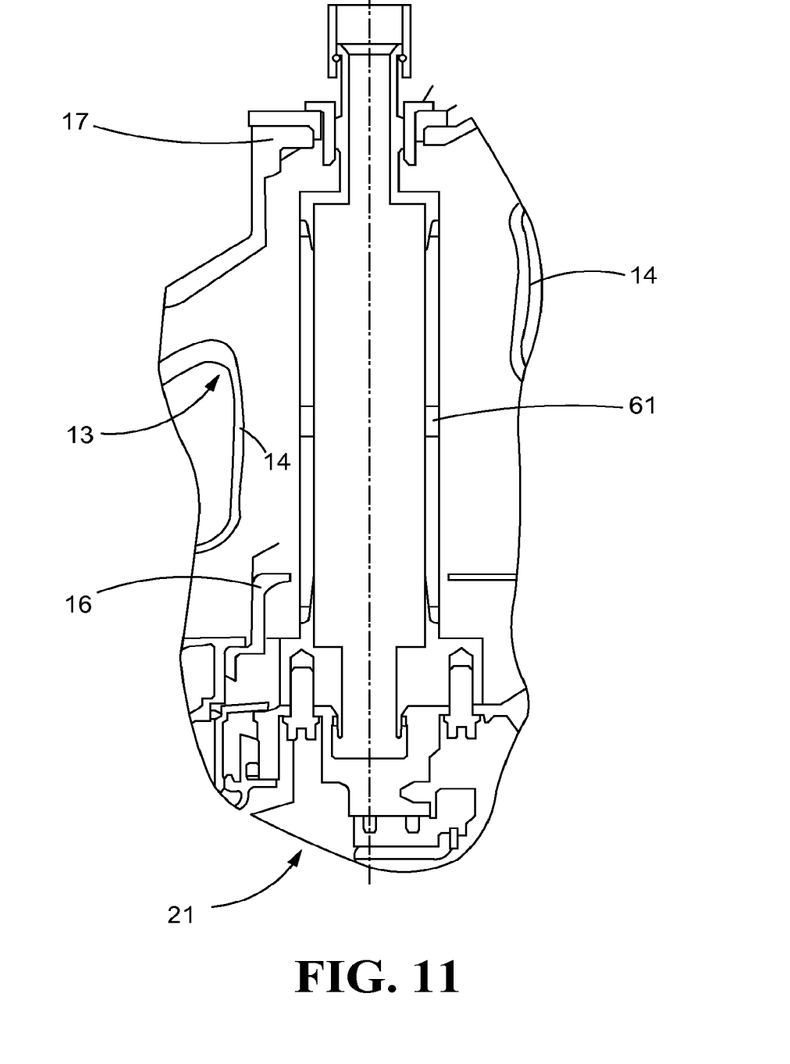
FIG. 11 is a partial sectional view illustrating the passage of a cold structure service line from the bearing case, through one of the hollow struts of the disclosed bearing to the outer case.

An exploded view of the MTF 10 is illustrated in FIG. 10. The MTF 10 includes four seals including the inner leading end seal 22, the outer leading end seal 23, the inner trailing end seal 24 and the outer trailing end seal 25. FIG. 10 also illustrates the use of multiple support rods 15 that connect the inner case 16 to the outer case 17. Although only five support rods 15 are shown in FIG. 10, the inner case 16 is configured to be connected to eight support rods 15, although the number of support rods 15 may vary as will be apparent to those skilled in the art. The inner heat shield 54 is also illustrated in FIG. 10 as is the inner HPT seal carrier 47. Finally, FIG. 11 illustrates the use of the disclosed MTF 10 for providing communication between the bearing case 21 and the outer case 17. Specifically, as shown in FIG. 11, a lubricant passage tube 61 may extend between the inner case 16 and the outer case 17. Lubricant may be supplied to the outer case 17 through one of the hollow struts 14 and from the bearing case 21 via the tube 61.

The disclosed seals 22, 23, 24, 25 seal the MTF cavities 18, 19 and provide full seals around the fairing rings 27, 31. The disclosed seals 22, 23, 24, 25 also provide a damping pre-load function.

The inner ring 31 of the fairing 13 also includes a trailing end 31 and a leading end 32 that include brazed support bands 36, 38 that engages the inner trailing and inner leading end seals 24, 22 respectively. The outer ring 27 of the fairing 13 also includes a trailing end 35 and a leading end 33 that include brazed support bands 39, 37 respectively that engage the outer trailing and outer leading end seals 25, 23 respectively. The seals 22-25 at the four corners of the fairing 13 seal to neighboring parts to create the MTF inner and outer cavities 18, 19 respectively. The seals 22-25 impart radial loads which provide a damped environment for the fairing cantilevered inner and outer rings 31, 27 trailing ends and leading ends 34, 35, and 32, 33 respectively.

While only certain embodiments have been set forth, alternatives and modifications will be apparent from the above description to those skilled in the art. These and other alternatives are considered equivalents and within the spirit and scope of this disclosure and the appended claims.

What is claimed:

1. A mid-turbine frame system comprising:
   an inner case and an outer case;
   the inner case including a first leading end and a first trailing end, the first leading end of the inner case being coupled to an inner seal carrier, the inner seal carrier supporting an inner leading end seal, the first trailing end of the inner case supporting an inner trailing end seal, a fairing including an inner ring spaced apart from and coupled to an outer ring by a plurality of hollow struts, the inner ring including a second leading end and a second trailing end, and the outer ring including a third leading end and a third trailing end;
   the outer case including a fourth leading end and a fourth trailing end;
   the inner leading end seal being sandwiched between the inner seal carrier and the second leading end of the inner ring of the fairing, the inner trailing end seal being sandwiched between the first trailing end of the inner case and the second trailing end of the inner ring of the fairing;
   each hollow strut of the plurality of hollow struts of the fairing accommodating a respective support rod of a plurality of support rods, each support rod of the plurality of support rods having an inner end connected to the inner case and an outer end connected to the outer case;
   the outer ring of the fairing including a plurality of attachment pin bosses, each attachment pin boss of the plurality of attachment pin bosses accommodating an attachment pin, each of said attachment pin being connected to the outer case;
   the fourth leading end of the outer case supporting an outer leading end seal, the fourth trailing end of the outer case supporting an outer trailing end seal, the outer leading end seal being sandwiched between the third leading end of the outer ring of the fairing and an outer seal carrier, the outer seal carrier connected to the fourth leading end of the outer case, the outer trailing end seal being sandwiched between the third trailing end of the outer ring of the fairing and the fourth trailing end of the outer case;
   wherein the fairing includes at least one brazed support band, the at least one brazed support band engaging at least one of the inner leading end seal, the inner trailing end seal, the outer leading end seal, and the outer trailing end seal.

2. The mid-turbine frame system of claim 1 wherein the second leading end of the inner ring of the fairing includes the at least one brazed support band, the at least one brazed support band comprising an inner leading end brazed support band, wherein the inner leading end seal is sandwiched between the inner leading end brazed support band and the inner seal carrier, the inner leading end seal providing damping between the inner leading end brazed support band and the inner seal carrier.

3. The mid-turbine frame system of claim 1 wherein the third leading end of the outer ring of the fairing includes the at least one brazed support band, the at least one brazed support band comprises an outer leading end brazed support band, wherein the outer leading end seal is sandwiched between the outer leading end brazed support band and the outer seal carrier, the outer leading end seal providing damping between the outer leading end brazed support band and the outer seal carrier.

4. The mid-turbine frame system of claim 1 wherein the second trailing end of the inner ring of the fairing includes the at least one brazed support band, the at least one brazed support band comprising an inner trailing end brazed support band, wherein the inner trailing end seal is sandwiched between the inner trailing end brazed support band and the first trailing end of the inner case, the inner trailing end seal providing damping between the inner ring of the fairing and the first trailing end of the inner case.

5. The mid-turbine frame system of claim 1 wherein the third trailing end of the outer ring of the fairing includes the at least one brazed support band, the at least one brazed support band comprises an outer trailing end brazed support band, wherein the outer trailing end seal is sandwiched between the outer trailing end brazed support band and the fourth trailing end of the outer case, the outer trailing end seal providing damping between the outer ring of the fairing and the fourth trailing end of the outer case.

6. The mid-turbine frame system of claim 1 wherein the inner ring of the fairing, the inner leading end seal, the inner seal carrier, the inner trailing end seal and the inner case define an inner diameter cavity.

7. The mid-turbine frame system of claim 1 wherein the outer ring of the fairing, the outer leading end seal, the outer seal carrier, the outer trailing end seal and the outer case define an outer diameter cavity.

8. The mid-turbine frame assembly of claim 1 wherein the inner ring and the outer ring of the fairing are frustoconically shaped and coaxial with respect to each other along a common axis, and the plurality of hollow struts are not parallel to the common axis and cause gases passing between the inner and outer rings to rotate.

9. The mid-turbine frame assembly of claim 1 wherein the plurality of hollow struts act as vanes for turning gases that pass between the inner and outer rings of the fairing.

10. The mid-turbine frame assembly of claim 1 wherein each of said attachment pin is slidably received in a respective attachment pin boss of the plurality of attachment pin bosses of the outer ring of the fairing for permitting the fairing to expand radially outwards towards the outer case and for permitting the fairing to retract radially inwards towards the inner case.

11. A gas turbine engine comprising:
a high pressure turbine, a low pressure turbine and a mid-turbine frame system disposed between the high and low pressure turbines for transitioning gases from the high pressure turbine to the low pressure turbine and for rotating said gases as said gases proceed from the high pressure turbine to the low pressure turbine;
the mid-turbine frame system including an inner case and an outer case, the inner case including a first leading end and a first trailing end, the first leading end of the inner case being coupled to an inner seal carrier, the inner seal carrier supporting an inner leading end seal, the first trailing end of the inner case supporting an inner trailing end seal, the mid-turbine frame system also including a fairing that includes an inner ring spaced apart from and coupled to an outer ring by a plurality of hollow struts, the inner ring including a second leading end and a second trailing end, and the outer ring including a third leading end and a third trailing end;
the outer case including a fourth leading end and a fourth trailing end;
the inner leading end seal being sandwiched between the inner seal carrier and the second leading end of the inner ring of the fairing, the inner trailing end seal being sandwiched between the first trailing end of the inner case and the second trailing end of the inner ring of the fairing;
each hollow strut of the plurality of hollow struts of the fairing accommodating a respective support rod of a plurality of support rods, each support rod of the plurality of support rods having an inner end connected to the inner case and an outer end connected to the outer case;
the outer ring of the fairing including a plurality of attachment pin bosses, each attachment pin boss of the plurality of attachment pin bosses accommodating an attachment pin, each of said attachment pin being connected to the outer case;
the fourth leading end of the outer case supporting an outer leading end seal, the fourth trailing end of the outer case supporting an outer trailing end seal, the outer leading end seal being sandwiched between the third leading end of the outer ring of the fairing and an outer seal carrier, the outer seal carrier connected to the fourth leading end of the outer case, the outer trailing end seal being sandwiched between the third trailing end of the outer ring of the fairing and the fourth trailing end of the outer case;
wherein the fairing includes at least one brazed support band, the at least one brazed support band engaging at least one of the inner leading end seal, the inner trailing end seal, the outer leading end seal, and the outer trailing end seal.

12. The gas turbine engine of claim 11 wherein the second leading end of the inner ring of the fairing includes the at least one brazed support band, the at least one brazed support band comprises an inner leading end brazed support band, wherein the inner leading end seal is sandwiched between the inner leading end brazed support band and the inner seal carrier.

13. The gas turbine engine of claim 11 wherein the third leading end of the outer ring of the fairing includes the at least one brazed support band, the at least one brazed support band comprises an outer leading end brazed support band, wherein the outer leading end seal is sandwiched between the outer leading end brazed support band and the outer seal carrier.

14. The gas turbine engine of claim 11 wherein the second trailing end of the inner ring of the fairing includes the at least one brazed support band, the at least one brazed support band comprises an inner trailing end brazed support band, wherein the inner trailing end seal is sandwiched between the inner trailing end brazed support band and the first trailing end of the inner case.

15. The gas turbine engine of claim 11 wherein the third trailing end of the outer ring of the fairing includes the at least one brazed support band, the at least one brazed support band comprises an outer trailing end brazed support band, wherein the outer trailing end seal is sandwiched between the outer trailing end brazed support band and the fourth trailing end of the outer case.

16. The gas turbine engine of claim 11 wherein the inner ring of the fairing, the inner leading end seal, the inner seal carrier, the inner trailing end seal and the inner case define an inner diameter cavity.

17. The gas turbine engine of claim 11 wherein the outer ring of the fairing, the outer leading end seal, the outer seal carrier, the outer trailing end seal and the outer case define an outer diameter cavity.

18. The gas turbine engine of claim 11 wherein the inner ring and the outer ring of the fairing are frustoconically shaped and coaxial with respect to each other along a common axis, the plurality of hollow struts are not parallel to the common axis and cause said gases passing between the inner and outer rings to rotate.

19. The gas turbine engine of claim 11 wherein each of said attachment pin is slidably received in a respective attachment pin boss of the plurality of attachment pin bosses of the outer ring of the fairing for permitting the fairing to expand radially outwards towards the outer case and for permitting the fairing to retract radially inwards towards the inner case.

* * * * *